April 16, 1974   L. PETERS   3,804,965
METHOD FOR ROASTING MEAT
Original Filed June 29, 1970   6 Sheets-Sheet 1

April 16, 1974   L. PETERS   3,804,965
METHOD FOR ROASTING MEAT
Original Filed June 29, 1970   6 Sheets-Sheet 3

April 16, 1974  L. PETERS  3,804,965

METHOD FOR ROASTING MEAT

Original Filed June 29, 1970

United States Patent Office 3,804,965
Patented Apr. 16, 1974

3,804,965
METHOD FOR ROASTING MEAT
Leo Peters, 750 Plymouth Road SE., Grand Rapids,
Mich. 49506
Original application June 29, 1970, Ser. No. 50,374.
Divided and this application Jan. 5, 1972, Ser. No.
215,620
Int. Cl. A22c 18/00, 21/00
U.S. Cl. 426—523
4 Claims

ABSTRACT OF THE DISCLOSURE

Meat is packaged with a web that is cool regardless of oven heat and that enables it to be roasted by suspending it like a hammock within an oven out of contact with any metal surfaces. The weight of the roast is uniformly supported by the web, and the relatively cool web enables the roast to cook evenly.

RELATED APPLICATION

This application is a division of my copending application entitled Method and Means for Packaging and Roasting Meat, Ser. No. 50,374, filed June 29, 1970.

BACKGROUND

This invention relates to a method and means for packaging and roasting meats. More particularly, the method provides the housewife and restauranteur with a method and means tailored specifically to, and packaged with, each roasting-type piece of meat purchased, that will reduce the loss of meat juices, increase overall tenderness, improve the "doneness" uniformity of the meat that is roasted to the point that boneless beef ribs can be roasted to a perfect "rareness," literally from outer edge to outer edge.

Many factors, internal and external, influence the finished result of roasted meat. This invention is concerned with certain external factors, individually and collectively, as they affect each other and, in turn, the internal finished result of the roasted meat. It is the general object of this invention to add, modify, alter, and/or eliminate certain external factors so that the finished internal result of the roasted meat is superior to the results obtainable under the present state of the art.

The art is old and extensive on various pans, frames, and racks (external factors) for roasting meats, but none of them singly, or in combination, present a simple, inexpensive, all-inclusive method and means for curing the deficiencies caused by the prior-art factors that are the subject of this invention; factors which have their beginnings at the wholesale or retail store and continue right on through to the finished roasted result. The worst of these deficiencies occur at the time of roasting, within the oven itself. These prior art deficient factors, and their interrelationships, are those which affect loss of meat juices and the uniformity, extent, and rate of heat penetration; both of which, in turn, have a major effect on the uniformity and the accuracy in the degree of "doneness," juiciness, and tenderness of the roasted meat.

This invention is applicable only to meats that can be roasted, i.e., meats that are cooked by exposure to radiant dry heat in an oven having heat-reflecting surfaces. This is in distinction to meats that are baked, i.e., cooked by substantially confining the meat in direct contact with the inside of a hot metal vessel, whereby heat is conducted through and by the vessel's walls to the meat inside, so that it is more directly the vessel's heat rather than the oven's heat that does the "cooking."

This invention has particular application to boneless roasts, filets, thick steaks of beef and veal, and carcass (bone-in) turkeys; and of general application for pork, lamb, and whole-carcass poultry such as chickens, ducks, etc.

For purposes of illustration this invention will be described mainly with boneless beef taken from the rib section of beef loins. Such sections are commonly referred to as boneless "rib roasts." They may also be rolled and tied. A beef rib roast, finished perfectly and completely rare, is chosen as the exemplary item of this invention because it is the most difficult item of all meat cookery to finish successfully. Until this invention such success has defied the skills of both housewives and restauranteurs.

Standard layman's literature on meat cookery defines the accepted internal qualities of well roasted beef as follows: Color should be even, and its shade match the extent to which it has been roasted; e.g., it should be bright pinky-red for "rare," reddish-brown for "medium," and greyish-brown for "well-done." All of it should be tender and juicy.

Standard scientific literature on meat cookery indicates how the condition of the meat-protein-cell fibers during roasting affect the general juiciness and tenderness of the finished roast. For example, if the meat-cell fibers are in a relaxed condition (i.e., not contracted from excessive heating or stretched from pressures due to weight-bearing) they hold their juices better, and the meat will "cook out" juicier and more tender. The more relaxed the protein-cell fibers, the less the weight (juice) loss, and the juicier and more tender the finished roasted meat.

The influence of heat on meat fibers

The roasting temperature, its uniformity, extent and rate of penetration, has a direct and positive effect on the relative relaxation of meat fibers. There are natural collagenase enzymes in beef, which under 140° F. attack and relax (soften and tenderize) the connective cell fibers, which in turn, also helps retain juice within the cells' walls. The higher the temperature over 140° F., the lower the ability of these collagenase enzymes to tenderize the fibers, and the greater the contraction (and hardness and toughness) of the fibers, and the greater the quantity of juices that will be squeezed out of the meat cells.

About 25% of the water (juice) in beef is "free" or "loose," i.e., extra-cellular (outside of the protein fibrous cellular structure proper), and 75% is "bound," "immobilized," or intra-cellular (inside the cell fibers). The "free" water is not free in the sense that it is flowing loosely around inside the body of the meat on the outside of the cells. Rather, it is mechanically immobilized by the network of membranes, filaments, cross-linkages, and electrostatic forces between the cellular chain on the outside of the protein (fibrous) cellular structure proper.

There is a continuous transition from the "bound" to the "free" state; a transition that can be remarkably speeded up by the application of very low pressures. Contraction of the cellular fibers, caused by a high-temperature-induced inability of the collagenase enzymes to relax them, will apply such low pressures, and quickly and easily decrease the immobilized water with a corresponding increase in the expressible water. It is quite common under present cookery methods (in the home especially) to lose 10% to 15% of a roast's total weight via such cellular contractions. And it is not uncommon to note examples of the rapidity with which temperature increases can disproportionately increase juice losses. For example, a 40% increase in temperature (from 250° to 350° F.), which is not an unusual difference between various housewives' roasting methods, can step up weight loss about 50% (from 10% to 15%). Thus, meat juices are lost, and a tougher, drier, meat roast is the result.

Loss of meat juices and toughening (contraction) of meat fibers from overheating, and/or nonuniform heating, are easily observable phenomena in any home or restaurant. It is commonly observable in beef that is roasted at any temperature above the "rare" level of 140° F.

For example, the common method of roasting a rib-roast is to place it in an open pan, and/or rack, within an oven. The bottom of the meat rests in direct, weight-pressured, contact with the pan's bottom or the rack's spaced metal surfaces. The meat is normally positioned with the fat side up so fat juices can "seep" downward, allegedly into the protein area. The metal pan or rack is always of a relatively heavy non-flexible gauge to support various sizes and weights of meat. Being a better conductor of heat, and having a body of considerably less thickness but greater density, than the meat itself, the body of the metal will more quickly come to, and more constantly stay closer to, the maximum heat of the oven than will the main body of the meat. In addition, the weight of the meat brings its pressure to bear at the points of meat-to-metal contact, which brings into action the well-known fact that pressured heat cooks food faster than nonpressured heat.

To illustrate: If a 4-lb. rib roast is to be finished "rare," a normal procedure is to roast it for 2 hours (30 minutes per lb.) in a 300° F. oven. The metal pan or rack in which it rests will reach 300° in a few minutes, at about the same time as the oven itself, while it will take 2 hours for the meat to reach only 140° at its center. With the metal pan or rack constantly close to the heat of the oven, and with 4 pounds overall pressure being exerted at the bottom of the meat, this means that the portions of the roast in direct pressured contact with metal, and adjacent thereto, will be roasting constantly at about 300° (and with 4 lbs. pressure across the meat-to-metal contact area, the roasting effect on the meat in this area is considerably greater than a 300° temperature alone would produce) while the meat not in metal contact will be roasting at considerably lower temperatures and pressures.

When such a roast has reached the 140° F. (rare) temperature at its center, and is removed from the oven for serving, two clearly observable evidences of toughness and/or fiber degeneration can be seen:

1. On the outside it will show sear marks (dark brown or black lines and/or areas) where the meat has been seared (i.e., dried out) and/or grossly overcooked (i.e., degenerated to ash) from contact with hot heavy-gauge metal. These sear marks are most visible if the meat is roasted on wire racks, and the sear marks from the wires can be seen in contrast to the meat surfaces that have not contacted the metal.

2. On the inside it will show the following: pinky-red and rare at the center where the temperature reached only 140°, and then from center to outside in deepening shades from pink to greyish brown; the latter evidencing both loss of juice and increased toughness due to increasing heats to which the areas closer to the surface are subjected. The net result: obviously not a "rare" finished roast, in the complete sense of the word.

This nonuniformity of roasting will have been aggravated by the following factors: When an oven's heat cycles on and off in maintaining its thermostat setting, the range of heats may be considerable. They may range from 10° to 30° depending on the thermostat, the oven's insulation, and the level of heat. It is common for the cycling range to average around 20° between its high and low points. So it is common for meat that is in contact with metal to be roasting at least 20° higher than the meat not in contact with such metal and considerably higher under the influence of pressured heat at the areas of meat-to-metal contact.

All of the roasting accessories used with present-day beef roasting are of relatively heavy non-flexible gauge metal. They will hold temperatures longer and remain constantly closer to the higher temperatures within the cycling range than will the ambient oven heat itself. This, combined with the pressures, results in meat at the meat-to-metal contact points being greatly over-cooked compared with the rest of the meat.

In addition to the problems of overcooking, toughening, and dejuicing of the meat adjacent to the metal contact points, the juices which seep and leak out of the roast and collect at the bottom of a metal pan, around the bottom of the roast, serve as a boiling medium, so that in addition to being subject to greater heats and pressures, this area is also subject to being boiled. The combination of these factors produces meat considerably more well-done than in those areas not so subjected.

The phenomena observable when roasting with heavy metal accessories are also observable when roasting a rib roast with the ribs in the meat. The rib bones being of greater density than the meat, they conduct and hold heat somewhat similar to metal, and the resulting roast shows somewhat similar effects: the meat adjacent the bones is always more "well-done" than the rest of the meat.

Regardless of the particular temperature at which a housewife or restaurateur desires to roast beef, but especially if they wish to stay at or under the critical 140° F. temperature to approach a relatively rare result all the way from center to the outside, it is imperative for good beef-roast cookery that all the factors affecting the final result, but especially both the per se heats and the pressured heats to which the meat is subjected, be carefully controllable and controlled.

It is a primary object of this invention, therefore, to provide a method and means, specifically designed for every individual cut of beef roasted at home or in a restaurant, that will allow a more even and uniformly accurate penetration of cooking heat (at whatever level, but especially at the 140° heat of "rareness") so that the tenderizing activity of the collagenase enzymes may be more evenly and uniformly controlled throughout every specific roast, so that, in turn, the relative relaxation (i.e., relative noncontraction: relative toughness-tenderness) of the meat fibers during the roasting process are more evenly controlled, which, in turn, more evenly and uniformly controls the amount of water (i.e., juice) loss and the relative juiciness of the finished roast.

The influence of weight-produced
pressure on juice loss

Loss of meat juices is also caused by weight-exerted pressure whereby the meat-cell fibers become so stretched and distended, so un-relaxed, and the extra-cellular network of membranes and linkages so distorted and broken, that juice is squeezed out in this manner too. First the "free" juices leak out, and if the pressure is sufficient and continuous, the cell fibers may also stretch and weaken to the point that "bound" juices are also released in quantity. The weight-exerted pressures that can produce this loss of juices is of the order of less than ¼-lb. per sq. inch, a weight pressure that easily can be produced by an ordinary home-size beef roast from its own weight.

Loss of meat juices from weight-exerted pressures is a common observable phenomenon. Its evidence is widespread in the "blood" (meat juice) soaked paper wrappers and/or "blood" collections in the plastic wrapper trays packaged with meat purchased by housewives. This phenomenon is observable already in such retail stores where beef cuts may be too tightly wrapped, tied, and/or piled on top of each other in the meat case. It usually becomes more evident after the meat has been handled, tumbled, crushed, and pressured in the non-refrigerated trip from store to home. It is not uncommon that from 3% to 6% of a rib roast's total juice content is lost in this manner.

This juice loss from weight-produced pressure continues high in the roasting oven because present day roasting accessories and/or methods, fail to provide the best means for distribution of a specific meat cut's own weight. More often than not meat is positioned and/or supported in a manner that the maximum, rather than the minimum, amount of weight is bearing down on its resting surfaces.

It is here that the shape and size of a meat roast also has important influence on the pressures bearing on the meat cells located in the area on which the meat rests. For example, a 4 lb. boned, rolled and tied rib roast of about a 6½″ diameter and a 4″ thickness shows the following weight-produced pressures and weight losses:

When resting on its:

circular (narrow) 4″ across side: 4 lbs. resting on about 16 sq. inches=¼ lb. pressure per sq. inch.

flat (wide) 6½″ diameter side: 4 lbs. resting on about 32 square inches=⅛ lb. pressure per sq. inch.

A ¼ lb. or ⅛ lb. per square inch pressure may not appear to be much, but it is sufficient to force a substantial amount of juice out of a 4 lbs. rib roast; out of meat membranes that are relatively weak, insofar as pressure-withstanding vessels are concerned. This amount can easily equal 6% of the entire water content of the roast, and up to 25% of the water content (all of the "free") of the area most immediately affected by the pressure.

A noteworthy fact for this invention is that, in the case of our sample, a 50% reduction of pressure (from ¼ lb. per square inch to ⅛ lb. per square inch) can reduce juice loss (increase juice retention) by about the same percentage, and with this sizable increase in juice retention also comes a corresponding increase in tenderness and an ability to achieve rareness. It is desirable, therefore, that weight-produced pressures from whatever cause, be reduced to a minimum.

In this connection I have discovered a new, nonobvious, unique way of substantially reducing weight-produced pressures on the protein section alone; the most nutritionally important and most economically valuable portion of a beef roast.

Prior methods for roasting such beef have always practiced roasting with the fat-side up on the theory that this enabled fat juices to seep downward and penetrate into the protein section, and thus keep both the inside and outside of the protein section from leaking its own juices or drying at the surface during roasting. There is no actual evidence that such fat juices do penetrate into unbroken protein cells and/or prevent protein juices from leaking out of such cells; as a matter of observable fact they do not do this. They do, however, prevent some drying out of the outside protein surfaces, and to that extent do prevent some loss of the "free" juices. However, such prior art practices did not know how to prevent the deleterious effect that such fat-oil run-off and collection had on the protein cells at the bottom of the vessels in which the roasting was done. If such protein areas were to be roasted rare, this was never accomplished, even if the roasting meat was elevated above the collecting hot fat-oil; they always came out well-done because the collected hot fat-oil would actually boil such areas, either directly or indirectly through heat and/or spatter emissions, when the roasting was done at the accepted prior-art temperatures in the high ranges above 212° F.

By using a preferred embodiment of this invention, i.e., a tubular, hammock-like constructed (a form and construction that provides for the packaged meat a meat-contoured contact on practically five of its six sides), nonperforate, web encasing a boneless beef rib (not rolled or tied) and roasting it with the fat-side down in this preferred package of this invention, I achieve the following benefits, advantages, and superior results compared with prior-art methods.

1.—Protein juice loss is reduced to about 1% or less.

The natural fat covering on a boneless rib of beef represents about 25% of the total weight of such a meat cut (depending on the grade and finish of the meat). And since this fat covers one of the cut's two broadest sides it can provide a wide and thick area on which the protein section can rest and cushion its cells. Thus the protein area can rest on a soft pillow-like bed of fat to which it is fiber-bonded in its original natural slightly curved shape. This, in turn, provides positive-positioned maximum possible distribution of protein-cell weight, and thus too, minimum possible pressure on the valuable (for eating) protein cells. Evidence of such effects is dramatic and positive in the tiny amount of protein cell juices that are excreted during roasting; an amount in the order of less than about 1% of the roast's protein weight. This is an unheard of accomplishment under any of the prior art methods for roasting beef. The fat-oil excreted is considerably more than that of the protein juice because now the fat-side is bearing the total weight of the meat cut. Even so, with my method and means (with positive weight support on substantially five of the six sides of the meat) there is not enough fat-oil excreted to lift the oil-collection level (within the meat-enfolding tubular package) upward into the protein area. This is particularly true if the beef is roasted at the 140° F. heat required for a rare finish.

2.—Pressured protein areas sealed against juice loss.

Where the protein and fat sections meet (where weight pressure on the protein section is greatest) they are tissue-grown and fiber-locked together so that any propensity on the part of the protein section to excrete juice at this pressured meeting point area is effectually sealed off and blocked by bonded cells of the fat section.

3.—Preserves and protects "rareness."

Any juices (protein and/or fat) that are excreted will drain to and collect at the base of the meat around the fat area, away from the protein area, and are thus prevented from contacting and/or overheating any of the protein area, which heated contact would damage some of the desired "rareness" result of the protein cells.

4.—No juice loss at the top of protein area.

The top of the protein side has no weight on it; so no cell distension or breakage can take place from any weight-produced pressures; and with the tubular web completely enfolding the meat in an evaporating-preventive manner, the top side is kept moist and juice loss in this area from drying is prevented.

5.—Protein area under lowest-possible weight pressure.

It is a coincidental bonus benefit of this fat-down roasting discovery that the natural dimensions of most of the beef roasts above 2½ lbs. of the various-sized boneless rib cuts have their narrowest dimensions (i.e., thickness) running from top to bottom when the fat side is down and their largest non-protein plane area (the fat covering), i.e. its largest per square inch (pressure-reducing) area, on which to rest its bearing weight. Here then is the most beneficial manner of positioning a boneless beef roast to achieve the lowest possible (practically nil) loss of protein juice, and thus the juiciest possible finished beef roast. It is therefore the preferred method of practicing this invention.

It is a second primary object of this invention, therefore, to provide a method and means specifically designed for, tailored to, adapted for, and structured to guarantee fat side down roasting, and part of the package of, every individual meat roast purchased in a retail store that will always reduce to at least the minimum of each specific roast's total weight, and preferably to the weight of the protein section alone, the amount of per square inch weight (or pressure) on its weight-bearing surfaces at any and all junctures in its journey from the retail meat case through the roasting oven, so that, in turn, the weight-produced pressures on the meat cells (especially the protein cells) in the vicinity of the weight-bearing surfaces will be reduced to a minimum, which, in turn, will reduce juice loss (especially the protein juice) due to pressure to the minimum.

The desire for rareness

In addition to tenderness and juiciness, the degree of "doneness" or "rareness," in beef roasts especially, is of critical concern to any cook. Rib roasts are one of the prized entrees most frequently used for special dinners in home or restaurant. Because of this, all cooks are seriously, even nervously, concerned over the results of their cookery with this item. A housewife especially has good reasons for being nervous because her results usually fall considerably short of her hopes and expectations; many of them outright failures.

These failures, both in number and extent, generally increase in direct proportion to the degree of rareness she is trying to achieve. If she is seeking to have here roast "medium" (i.e., midway between "rare" and "well-done") or "medium rare," she is dealing in degrees of "rareness," that require tight control over the interrelated factors that influence the desired result. Such control increases in difficulty and criticalness as the desired result goes from "well done" to "medium" to "medium rare" to "rare". To achieve a roast that is truly "rare" (i.e., pinky red) from center to the skin-edged outside, and uniformly so thru the entire body of the roast, is an accomplishment very few, if any, housewives or chefs are able to achieve. Very few of them are even able to control the several external factors that influence an accurate desired internal result.

More often than not in today's home cookery, if the housewife wants a "rare" rib roast, it will come out "raw" (i.e., substantially uncooked) in the center, "rare" midway between center and outside, and "well-done" in various depths along the outside. Or, if it is "rare" at the center, it will be "well-done" in varying degrees from midway to outside. This is also true of the restauranter, but in lesser degree because he has more expert and constant experience with roasting ribs of beef.

The appetite for beef roasted rare has increased markedly in recent years. Today the majority of consumers prefer their rib-roasts rare, or at least medium-rare, rather than "well-done." This preference has been stimulated by a growing empirical awareness that such meat is more flavorful, more tender and juicier, than meat roasted "well-done."

The cooks who wish their beef rare, use the well-known standard temperature guide of 140° F. internal temperature (thermometer-inserted reading) in their attempts to achieve the desired "rareness." Both the preferences for "rareness" and the use of the 140° guideline, have firm bases in the known scientific facts that: (1) at the 140° F. line the natural collagenase enzymes are still within a favorable temperature climate to actively attack the tough fibrous connective tissues, while at the same time roasting the meat so it is no longer "raw"; while as the temperature rises above 140° these enzymes become less active; and that (2) "rare" beef is measurably higher in flavor, juice, and tenderness.

The pressure on the juices in beef cells, either from contraction of their fiber walls due to excessive heat (and therefore also from inactivity of the collagenase enzymes) or from distortion of the fibers due to weight-produced pressures has a direct effect on any cook's ability to obtain the degree and uniformity of "rareness" desired. To the extent that a beef cut has lost its original juice, to that same extent it has lost its ability to "roast-out" rare. My objectives of greater tenderness from better heat control and more juiciness from better pressure control therefore also have a direct and related influence on the ability of any cook to achieve a "rare" beef roast.

It is therefore a third primary objective of this invention to supply housewife and restaurateur with a simple, inexpensive, method and means tailored to, and packaged with, every meat roast they buy, that will more accurately and conveniently enable them to produce finished roasts that are more predictably, completely and uniformly rare thru-out the entire inside; from the center to the very skin-edge around the entire periphery of the roast's protein section.

A universally adaptable package for maximum tenderness and juiciness

Prior art presents a prolixity of methods and means (e.g., pans, frames, and racks) that allegedly, but not actually, achieve some of my objectives. For example, there is a large variety of rotisseries designed to keep juices that have been forced to the surface from dropping off the meat and to provide an even penetration of heat. This is allegedly done by keeping the excreted juices flowing in contact with the meat's surface by rotating it on a spit. But, at the same time heat conducting, and therefore fiber-tightening and juice-extracting prongs pierce far into the interior of the roast, nullifying in large part the sought-for objective of juice retention; an objective that is allegedly obtainable by this method, but is neither empirically nor scientifically provable.

Other devices in the prior art pick up, and pour back on the meat, juices that have already dropped off. There is no evidence to indicate that once the juice has been forced out of contracted and/or broken cells the process can be reversed and the juice forced and held back in. There is no empirical or scientific proof to support the idea that this kind of "basting" results in a net reduction of internal juice loss.

Still other devices are designed simply to keep meat raised up from contact with the bottom of a pan to allow even heat circulation and/or to fit special carcass contours of some meat items; but these do not per se distribute pressure-producing, fiber-stretching weights evenly.

The pans, frames, and racks available for purchase are of such comparatively large sizes and shapes that most housewives do not have kitchen storage space for more than 1 or 2 of them. Also, all are too expensive to be purchased and discarded (like a tin can) with every particular roast she buys. Thus, because the various meat roasts have considerable variety in their shapes, sizes, and weights, and because the very few pans, frames, or racks possessed by the average housewife (or even the average restaurant) fit all the roasts she buys. she is limited in her ability to coordinate the two situations so they could cooperate to minimize weight-produced pressures and maximize meat-cell fiber relaxation and enzyme and juice retention during roasting.

Nor can the average retailer or wholesaler be of much help to correct this lack of coordination and cooperation between what he sells and the apparatuses on which the meat may be roasted. Nature, and the economics involved, limit the sellers in the extent to which they can tailor and reshape roasts to fit the precise pan, frame, or rack in which every particular cook may wish to roast the meat. So the majority of cooks, housewives especially, suffer with what is presently available; both in the meat cuts they can buy, and the roasting accessories they have at hand.

The tremendous quantity of the prior art in the meat-roasting accessory field indicates the deep and widespread concern over the massive amount of thinking and effort that has gone into and the need for solutions of, the meat-roasting problems of every housewife and restaurateur. Despite this prolixity of the prior art several serious deficiencies common to all remain:

1. None is really an all-purpose accessory capable of distributing pressures from weight-bearing to the best possible advantage for the reduction of juice and collagenase enzyme losses. All are made of relatively heavy gauge metal, and therefore of rigid construction. They lack the flexibility needed to fit smoothly around each different size and shape of roast. Therefore, the modern cook is really without a direct, simple, universally-applicable, perfect-fitting device for all roast meat contours and shapes that will provide the maximum weight-distributing function for reducing to the minimum the fiber-stretching and juice and enzyme losses due to pressure from weight.

2. None of it is capable of functioning as a good relaxer of meat fibers so that the natural tenderizing activity of beef's collagenase enzymes may be more evenly and uniformly controlled so that, in turn, there is improved control over both tenderness and juiciness. As a matter of fact, because all present-day accessories on which roasts must rest their weight are made of metal that is relatively heavy, dense, and rigid, and because all of them in varying degrees are in direct pressured and/or meat-pierced contact with their roasting meats, they do just the opposite. The metal used in all the prior art has heat-exchanging and heat retention properties that promote, rather than retard, searing and over roasting of meat at its points of contact with roasting meat; that retard, rather than promote the natural tenderizing activities of the collagenase enzymes. So the greater the area of metal-to-meat contact and pressures in the prior art field, the greater the difficulty in controlling the uniformity of the roast. Metal surfaces act as heat exchangers; transferring low temperature heats out of, and high temperature heats into, the meat, both in intensity and continuity. Heavy gauge metal, in its entire body, is always closer, more instantly and continuously so, to the highest heat of the oven's heat cycling range than is the body of the meat. Therefore, these higher heats and greater pressures in the areas of meat adjacent to the metal-to-meat contacts produce meat that is always more "well done" and over roasted than it is in the main body of the meat.

The exception to this general metal-to-meat rule is when the metal is of such a thin (0.001" to 0.005" thick) gauge as to classify as a metal foil. When meat rests on such a metal foil, and is separated from any heavier gauge metal by a peripheral area of the foil all around the base of the meat, then a surprising condition results; a result that is similar to having meat rest on a non-metallic, relatively nonheat-conducting surface. Such metal foil, on a per square inch measurement comparison with meat juice surfaces, is lighter in weight and of lower density than the meat juice; it will actually float on top of a pool of such juice. Such metal foil is also cool to the touch of one's hand even though other metal in the oven, and even the surface of the roasting meat, is burning hot to the touch. Thus it will function for my invention similarly to such nonmetallic substances as cotton or plastic webbing or mesh. As a rule-of-thumb reference on the functioning of metal foils: if the human hand can touch them without hurting while they are in the oven with roasting meat at temperatures considerably above body heat, then such foils will function for the purposes of this invention; i.e., if the metal foil is actually cool to the human touch when the oven walls are too hot to touch, then such metal may be used for the structure, and in the functioning, of this invention.

3. None of it is sufficiently inexpensive to be purchasable and disposable with every roast the housewife or restaurateur buys. Therefore it is all economically and commercially impractical for packaging with, and tailoring to fit, the design need of every cut and/or carcass of meat.

Thus, on the one hand (1) when consumers purchase meat for roasting, they are confronted with a wide range of sizes, shapes, and weights, while on the other hand (2) they are confined within narrow limitations on the sizes, shapes, structural and metal make-up of the plans, frames, and/or rack accessories they possess on which to roast their meat, so that (3) very few of the roasts they buy will fit into and/or be accommodated by their cooking accessories in the best possible heat distributing, fiber-relaxing, pressure-relieving, juice-enzyme-retaining manner.

While my invention offers a simple solution to the problem of roasting beef to a perfect rareness, the solution was not at all obvious. Considerable time and experimentation was involved before the simple (and thus the commercially practical) solution made its appearance. The tremendous quantity of the prior art, with its continuing deficiencies and failures in offering real solutions, further attests to the nonobviousness of my simple answers to the problem.

It is a fourth primary objective, therefore to provide both the housewife and the restaurateur with an inexpensive, oven rack or frame suspendable, flexible, hammock-like, universally adaptable, low density, non-heat-retaining, web of material on, and/or in, which their meat can rest while roasting, which is tailored and/or flexes to the shape and size of, and is, or can be, an integral or accessory part of the package of, every roast they buy, and which will function to promote the natural tenderizing activity of the collagenase enzymes and to the best advantage of the first three primary objectives.

The interrelationship of the various internal and external factors bearing on a successful roasting result, and the overall combined objective of the four primary objectives may be sumarized as follows:

A method and means for roasting meat that is:

(1) specifically adaptable to, designed to fit, and economically feasible for packaging with, each individual item in wide range of weights, sizes, and shapes of various meat roasts, and which
(2) will universally and substantially improve the predictability of roasting results, especially in terms of rareness for beef, and which will also substantially improve relaxation of meat fibers caused by either
(3) heat or
(4) pressure, and thus
(5) improve fiber tenderness and reduce loss of meat juices accumulated from the time of purchase through the time of roasting, and do so
(6) with a package structure especially designed for roasting beef with the fat side down.

None of the prior art in the meat-roasting field, either singly or in combination discloses such a method and/or means. None of it (1) is specifically designed to fit, and/or is commercially feasible for packaging with, each individual item in the wide range of weights, sizes and shapes of various meat roasts, and which (2) will universally and substantially improve the predictability of the roasting results, especially in terms of rareness, and which will also substantially improve relaxation of meat fibers caused by either (3) heat or (4) pressure, and thus (5) improve fiber tenderness and reduce loss of meat juices accumulated from time of purchase through time of roasting, and (6) do so in the preferred fat-side down embodiment of this invention. It becomes, therefore, the overall primary objective of this invention to achieve these four primary objectives as they are embodied in the six interrelated considerations which bear on a successful roasting result.

Juice collection and preservation

The liquids (i.e., juice mixtures of water, proteins, and fats in the oil phase) that leak out of and drop off roasting meats also present problems for the housewife and restaurateur. If the juices collect in the bottom of a pan in which a roast rests, they function as a liquid in which meat is boiled instead of dry roasted. This is a common situation, and it results in meat at the bottom of such pans that is always well done; it is boiled instead of roasted. Even if other portions of the meat are rare, this portion will be well done. It is desirable, therefore, if meat is to be roasted rare, that such excreted juices be drained away from, and/or be prevented from accumulating around the protein fiber (nonfat) area of roasting meat.

Furthermore, if the juice are collected in a metal pan, especially at temperatures normally used by prior art roasting, whether or not in contact with the meat, the water portion gradually evaporates and the fat portion spatters out of the pan, so that with lean meat, only a dry residue of protein matter remains, usually stuck firmly to the bottom of the pan. If a housewife wishes to make gravy of this she has difficulty reconstituting and delumping it.

While the amount of juice excreted from meat roasted by means of my invention is relatively small, and in many instances almost nil, it is desirable to be prepared to dispose of and/or accommodate it if and when it does excrete. My invention is admirably suited for such an accommodation because my oven-elevated roasting package structure provides a substantial space between the suspended meat-holding web and the base of the oven; a space fully adequate to accommodate a small bowl, saucer, or a formed film pocket attached to the underside of my web to catch and hold any draining juices in a relatively non-evaporable condition. Or if the roast is boneless, and not rolled or tied, and is positioned within a plastic tube with its fat side down the thickness of the fat section will provide a raised platform underneath and away from the protein section around which excreted juices can accumulate.

It is therefore a fifth object of this invention to provide a juice drainage and collection means that can drain away, collect, entrap, and/or hold released roasting meat juices out of contact with the protein fiber (nonfat) areas of the meat without evaporation or spattering.

The five major objectives of this invention are designed to produce, and do accomplish, the following ten detailed functional, and interrelated advantages over the prior art:

1. A method and means for packaging and/or roasting a boneless or carcass (bone in) piece of meat that is universally applicable and individually adaptable to the wide variety of weights, sizes, and shapes found among the meats and poultry that are the subject of this invention, that
2. is sufficiently low cost so it will be commercially purchased and accepted as a disposable, expendable item that
3. can be tailored to fit compactly around, and provide a protective weight-bearing housing, and/or surface protector for every individual piece of meat with which it is sold, so that it becomes an integral part and/or accompaniment of a retail package, and
4. is structured, so that at the time of roasting, its function will change from one of a protective packaging role to a supportive roasting role best suited to hold the roast in a position that
5. will suspend the roast in, and/or on, a flexible, cool-to-human-touch, hammock-like web that can be flexed and moved to conform to, and enfold, the contacted surfaces of the roast, so that it
6. contacts a maximum amount of the roast's surface so that, in turn, a maximum amount of a beef roast's protein weight is distributed across a maximum amount of weight-bearing surface (preferably across the soft fat covering to which it may be naturally attached) and
7. permits the roast to be positioned so that with boneless meat the narrowest overall dimension can be in perpendicular (least amount of weight bearing) and/or fat-down relationship to the base of the enfolding, supporting, web platform, hammock, or sling, so that (5), (6), and (7) working and cooperating together result in a minimum of weight-producing pressures that otherwise would act to press out the protein juice in the area where weight-bearing is greatest, and
8. separates and/or isolates the roasting meat from any contact, direct or through the web, with any material that has a per-square-measure weight greater than the surface-weight resistance of meat juices and/or has better heat-retention properties than the meat itself and/or is hotter to the human touch than is the ambient heat within the oven, and
9. permits excreted juices to drain and escape from, and/or prevents their collection around, the protein fiber areas of the roasting beef; enabling collection instead in a moisture-retaining area or pocket within the meat enfolding web or in a vessel underneath the suspended meat, and in doing all this
10. provides a package structure that is "foolproof" for producing a perfectly rare roasted beef rib roast.

DESCRIPTION OF THE DRAWINGS

Several embodiments of the invention are illustrated in the accompanying drawing in which.

DESCRIPTION OF SPECIFIC EMBODIMENTS

Figure 1:
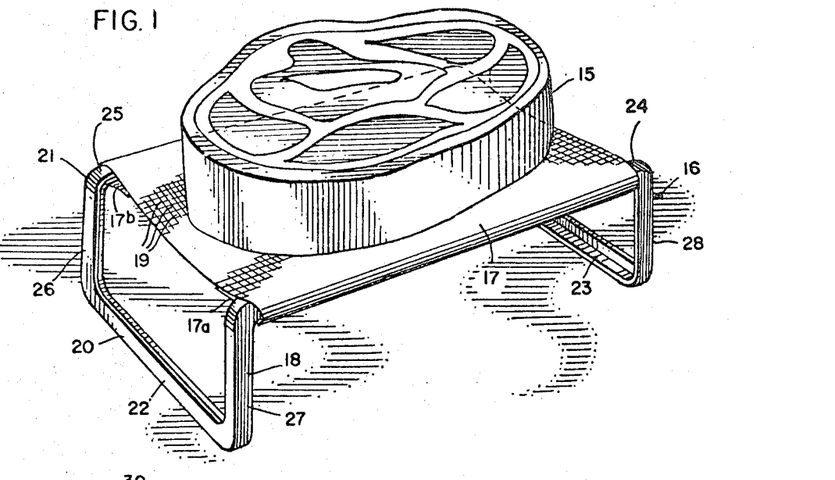
FIG. 1 is a perspective view of a roast suspended for roasting on one form of the inventive apparatus.

Referring to FIG. 1, a roast 15 is suspended for cooking by roasting apparatus 16 which includes a web 17 supported by a frame 18. The web is sufficiently non-heat absorbent and/or sufficiently fast in heat radiation, convection, and/or conduction that it is not hot to the human touch regardless of the temperature at which the meat is roasting. The human hand should be able to touch and/or hold my webbing without being burned or feeling pain. My web is so thin, and/or nonheat retaining, that only fine thermocouple instrumentation could measure its temperature. Since this is neither available nor practicable for a housewife to use, I prefer to use human body heat as a temperature indicator for the desired nonheat retaining function of my webbing. This low heat-retention quality of my webbing is necessary to prevent over-cooking (overheating) of the kind that is now present with the heavy-weight metal accessories used in today's meat cookery.

In addition to the necessary low-heat retention quality, my webbing should be sufficiently flexible so that it will function like a cradle or hammock in draping and conforming itself to the resting surfaces of the meat during roasting. It may be of an open or perforated nature, or with sloping grooves, to permit liquid juices to drain and escape through the web and thus prevent a pool of juice collecting underneath and around the base of the roast; a pool which, if not drained away, would tend to boil the meat in that area. With such a webbing, the meat that rests on it is literally dry roasted around its entire surface. Furthermore, the perforations and/or drain grooves permit the escaping juices to be collected in a small pocket or vessel underneath the webbing in a manner that will keep them from evaporating and frying; and thus preserve them for easy use in making gravy.

Such material as high-heat-resistant, flame retardant, non-heat-retaining, and/or noninflammable cotton, paper, glass, or plastic open-mesh fabrics with mesh sizes within the range of about 0.1 inch to about 1.0 inch or perforated films with perforations of sufficient size to permit meat-juice drainage; certain formulations of nonperforated thermoplastic films or sheets obtainable in the cellulose triacetates, polyamides, and polysulfones, in gauges within the range of about 0.001 inch (for the small home size roasts) to about 0.01 inch (for the heavy restaurant size roasts) depending on the weight of meat to be supported, and thin metal foils in the gauges normally sold for household use, are all candidates for the webbing in my invention.

The particular web 17 illustrated in FIG. 1 is formed of mesh material having openings 19 through which the juice may drain from the roast.

To protect my roast against pressures from outside weights, while at the same time provide a means for suspending the roast on a webbing while roasting, I provide a frame 18 shaped to perform both of these functions, and packaged around the meat and inside a wrapper or carton that holds the meat, webbing, and frame in fixed positions so that the frame and webbing can perform their combined protective, in-transit, housing function. At point of end use the wrapper or carton is removed and the meat placed on top of the frame-supported web for roasting, whereby the frame and webbing changes function from one of protective-housing to one of a supporting-platform.

My frame is preferably structured from plastic, paper, or metal tubing, rods, or angles, whichever is closest to the lowest cost in relation to weight supporting ability. Such a frame is made in size and shape to conform to individual sizes, shapes and weights of meat cuts. It is formed and shaped to function both as a sling-like or hammock-like support for my webbing during the roasting process, as well as a protective-housing for the meat against outside bearing weights while the meat is in transit from the meat packaging plant to the consumer's home. In its protective housing role it has dimensions which circumscribe and encompass the general overall cubic dimensions of the meat it is protecting. Thus when it changes to its hammock-like role during roasting it per se suspends, elevates, and spaces the roasting meat away from whatever base on which it rests within the oven, and does so at a distance at least equal to the height dimension of the meat it encompassed while in transit through the channels of trade. Suspending and spacing the meat at such a distance, from whatever base the frame is resting on in the oven, is adequate insurance that sufficient ambient heat separates the meat from any high-heat-retaining and heat-reflecting surfaces that otherwise, from close proximity, might overcook the roasting meat.

Such a frame should preferably approximate the cost of a tin can used for canned foods.

The particular frame 18 illustrated in FIGS. 1–5 has a base portion 20 and a web-supporting portion 21. The base portion includes a pair of spaced-apart generally parallel rods 22 and 23, and the web-supporting portion includes a pair of spaced-apart generally parallel rods 24 and 25 which extend generally perpendicularly to the rods 22 and 23. The rods 24 and 25 are supported above the rods 22 and 23 and connected thereto by four connecting rods 26, 27, 28 and 29. The particular rods 22–29 illustrated are formed from an integral rod which is bent to form the frame 18 and which is generally L-shaped in transverse cross section to provide a sturdy yet light-weight structure.

The web is seen to include a pair of end portions 17a and 17b which are wrapped about the rods 24 and 25 and secured by adhesive, stitching or the like, to the under surface of the web to suspend the web in hammock-like fashion. The spacing between the rods 24 and 25 is such that the particular roast 15 which is to be roasted with the apparatus is supported completely by the web and does not touch the frame.

The connecting rods 26–29 space the roast upwardly away from the bottom surface of the oven to protect the roast from the heat of the oven surfaces. The length of these connecting rods is preferably at least as great as the thickness of the roast if it is desired to use the frame as a protective housing for the roast while it is in transit from the meat packaging plant to the consumer's home.

Figure 2:
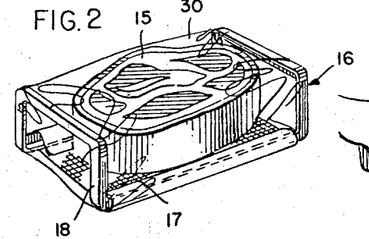
FIG. 2 is a perspective view of the roast packaged within the roasting apparatus of FIG. 1.
Figure 3:
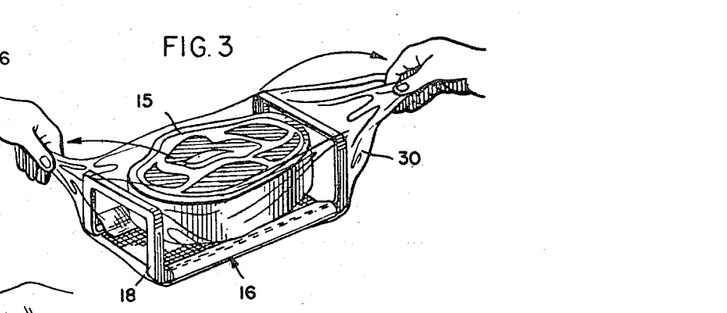
FIG. 3 is a view illustrating the step of unwrapping the package shown in FIG. 2.
Figure 4:
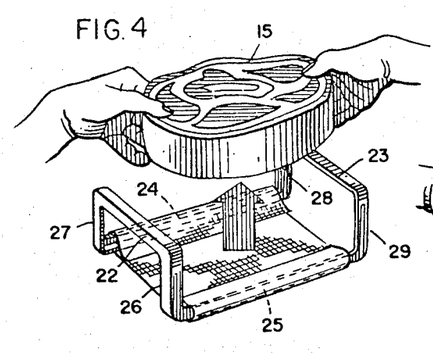
FIG. 4 illustrates the removal of the roast from the roasting apparatus which has served as a package.
Figure 5:
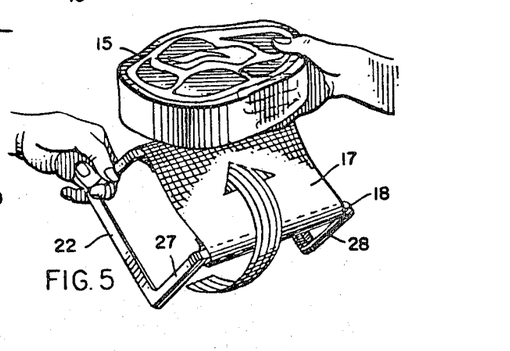
FIG. 5 illustrates the repositioning of the apparatus to serve as a roast support as shown in FIG. 1.

Referring to FIG. 2, the meat 15 is packaged within the roasting apparatus 16, and an outer wrapper 30 covers the roasting apparatus and the meat. The rods 24 and 25 are longer than the width of the meat, and the connecting rods 26–29 are longer than the thickness of the meat so that the meat is completely encompassed by the connecting continuous-rod frame. The meat rests on the web 17 and the frame protects the meat from meat packages which may be stacked thereabove. When the consumer desires to roast the meat, the wrapper 30 is removed as shown in FIG. 3, the meat is withdrawn from the protective frame as shown in FIG. 4, the roasting apparatus is inverted as shown in FIG. 1. The area of the meat-supporting portion of the web is seen to be slightly greater than the area of the surface of the meat that is supported so that the upward force per unit area exerted on the meat is minimized.

Figures 6, 7, 8, 9:
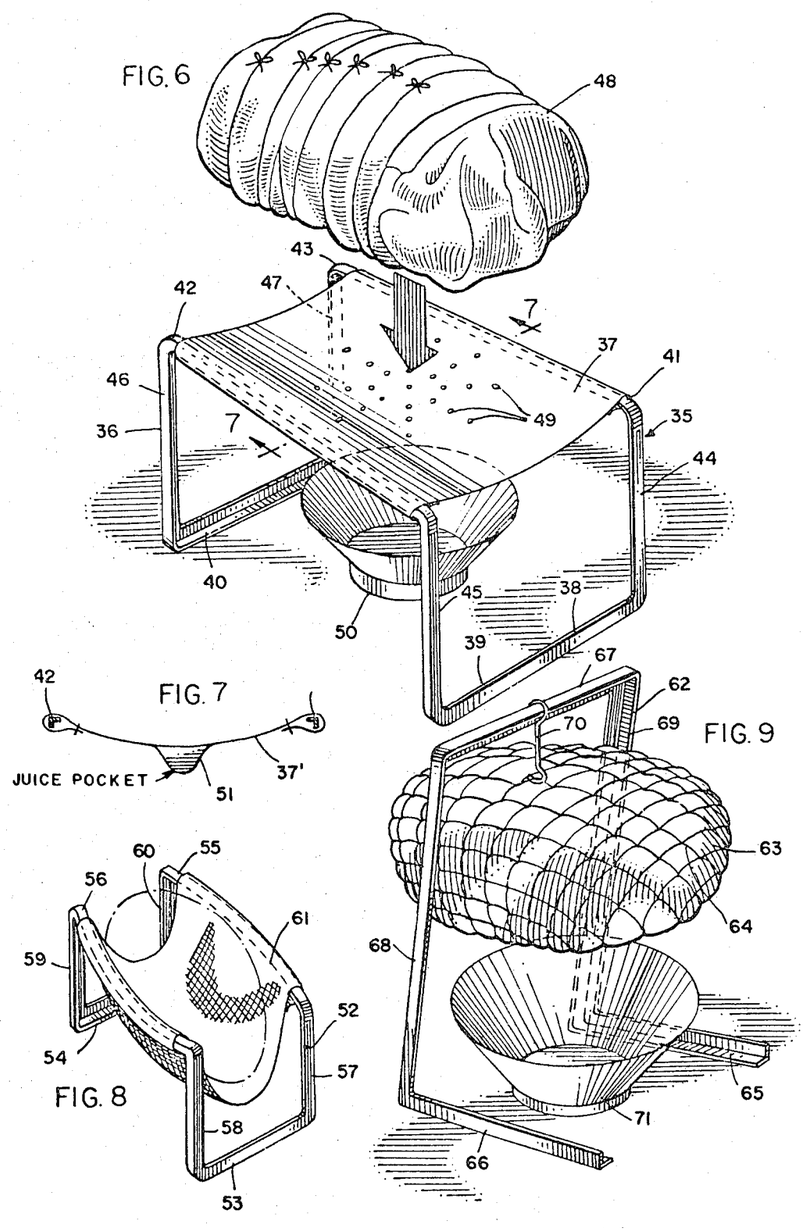
FIG. 6 is a perspective view of a modified form of the inventive apparatus for supporting a roast.
FIG. 7 is a sectional view taken along the line 7—7 of FIG. 6 with a juice-collecting pocket sealed to roast-supporting web.
FIG. 8 is a perspective view of still another embodiment of the invention.
FIG. 9 is a perspective view of another embodiment of the invention.
Figure 10:
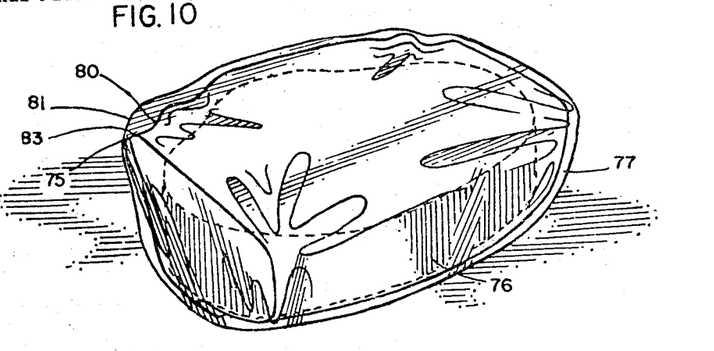
FIG. 10 is a perspective view of a roast packaged with a roast-supporting web.
Figure 11:
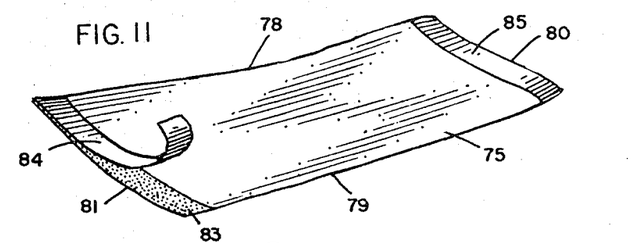
FIG. 11 is a perspective view of the web of FIG. 10.
Figure 12:
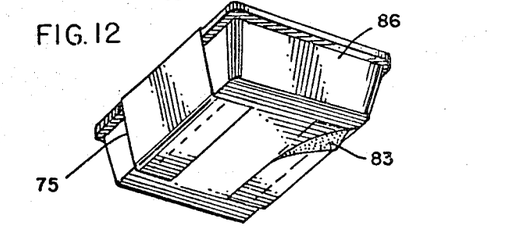
FIGS. 12 and 13 are perspective views illustrating the use of the web of FIG. 11 in combination with a conventional pan to support a roast.

Referring now to FIG. 6, a modified roasting apparatus 35 includes a frame 36 which supports a web 37. The frame 36 is similar to frame 18 and includes a base portion 38 which includes spaced-apart rods 39 and 40 and a web-supporting portion 41 which includes spaced-apart rods 42 and 43. Connecting rods 44, 45, 46 and 47, which are slightly longer than the connecting rods of the apparatus 16, join the web-supporting portion and the base portion.

A boned and tied roast 48 is suspended for roasting on the web 37, which is formed of metal foil and provided with perforations 49 in the central portion thereof for allowing juices to drain away. A juice collecting cup 50 may be positioned below the perforated portion of the web between the base rods 39 and 40. Once again, the spacing of the rods 42 and 43 is such that the roast 48 is completely supported by the web 37 between the rods.

An alternative web 37 which permits the apparatus 35 to be used without the juice collecting cup 50 is shown in FIG. 7, which is a sectional view of the modified web as would be seen along a line 7—7 of FIG. 6. The web 37 includes a juice collecting pocket 51 secured to the under-surface of the web below the perforated central portion thereof. As juice drains from the meat through the perforations 49, it is collected by the pocket 51, thereby preventing the formation of a pool of liquid adjacent the bottom surface of the oven which may boil and evaporate.

FIG. 8 shows still another embodiment of the roasting apparatus which is particularly suitable when used with somewhat oval boned and tied roasts. Frame 52 includes base rods 53 and 54, web-supporting rods 55 and 56, and connecting rods 57, 58, 59 and 60. The rods 55 and 56 are seen to be arcuate or curved, having their greatest separation at approximately the midpoints thereof. Mesh web 61 is supported by the rods 55 and 56 in the manner hereinbefore discussed and is seen to drape substantially downwardly toward the base rods 53 and 54. A generally oval-shaped roast indicated by the dashed line can be conveniently supported by the web out of contact with the curved support rods 55 and 56, and the web will support the roast throughout a substantial portion of the curved periphery thereof by virtue of the downward draping of the web.

In FIG. 9, a frame 62 supports a boned and rolled roast 63 contained in a web formed by a plurality of ropes or strings 64. The frame 62 includes a pair of spaced-apart base rods 65 and 66, a support rod 67, and connecting rods 68 and 69. A hook 70 is secured to the connecting rod 67 and is hooked on to one of the tie strings 64, thereby utilizing the tie strings to provide a hammock-like and/or a pendulum-like, support for the meat. A juice-collecting cup 71 may be positioned below the meat if desired. The spacing between the connecting rods should be such that the meat does not contact any of the metal rods.

An alternative method and means for achieving certain of the objectives of my invention is to provide a web construction fitted with, or accompanied by, attachments such as clips, tie-strings, hooks, magnets, weighted ends, releasable adhesive strips along opposite ends, or any other means which will enable the web to be spread across the upright edges of a cake or sauce pan (types of pans which every household possesses) and hold it in this position so as to support the weight of my roasting meat. This alternative web-supporting, framework, method provides an extremely inexpensive means for practicing the most important phase of my invention. It is especially adaptable for use with frozen meats since such meats do not require protection against weight pressures while in transit through the channels of trade, but they do require protection against scuffing, abrasion, and freezer-burn. For these purposes my webbing provides better protection than just a carton or wrapper. So, for these purposes my web performs a superior functional service, over against conventional and less expensive wrapping materials in addition to its primary purpose as a cool web on which to roast meat.

Figure 13:
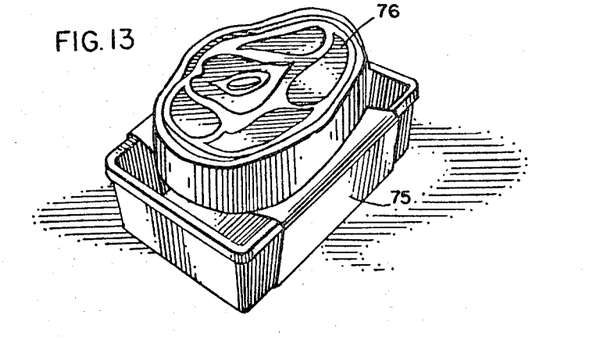

For example, referring to FIGS. 10–13, a plastic web 75 is packaged with a meat roast 76 enclosed within an outer wrapper or carton 77. The web 75 is longer than the width of the meat and is packaged within the wrapper 77 in a wrapped-around-meat condition to provide protection for meat surfaces against scuffing, abrasion, and freezer-burn. The web includes a pair of longitudinal edges 78 and 79 and a pair of transverse edges 80 and 81. A strip of pressure sensitive adhesive 83 is provided adjacent each of the transverse edges of the web, and the adhesive is protected by release strips 84 and 85. When the meat is removed from its wrapper 77, the web 75 may be wrapped around a conventional pan 86 and secured by means of the adhesive strips 83 which stick to the bottom of the pan, as shown in the perspective from the outside bottom of the pan in FIG. 12. Preferably, the size of the pan is such that the roast 76 can be supported by the web 75 between the sides of the pan as illustrated in FIG. 13 so that the meat will not be supported or contacted by metal.

Figure 14:
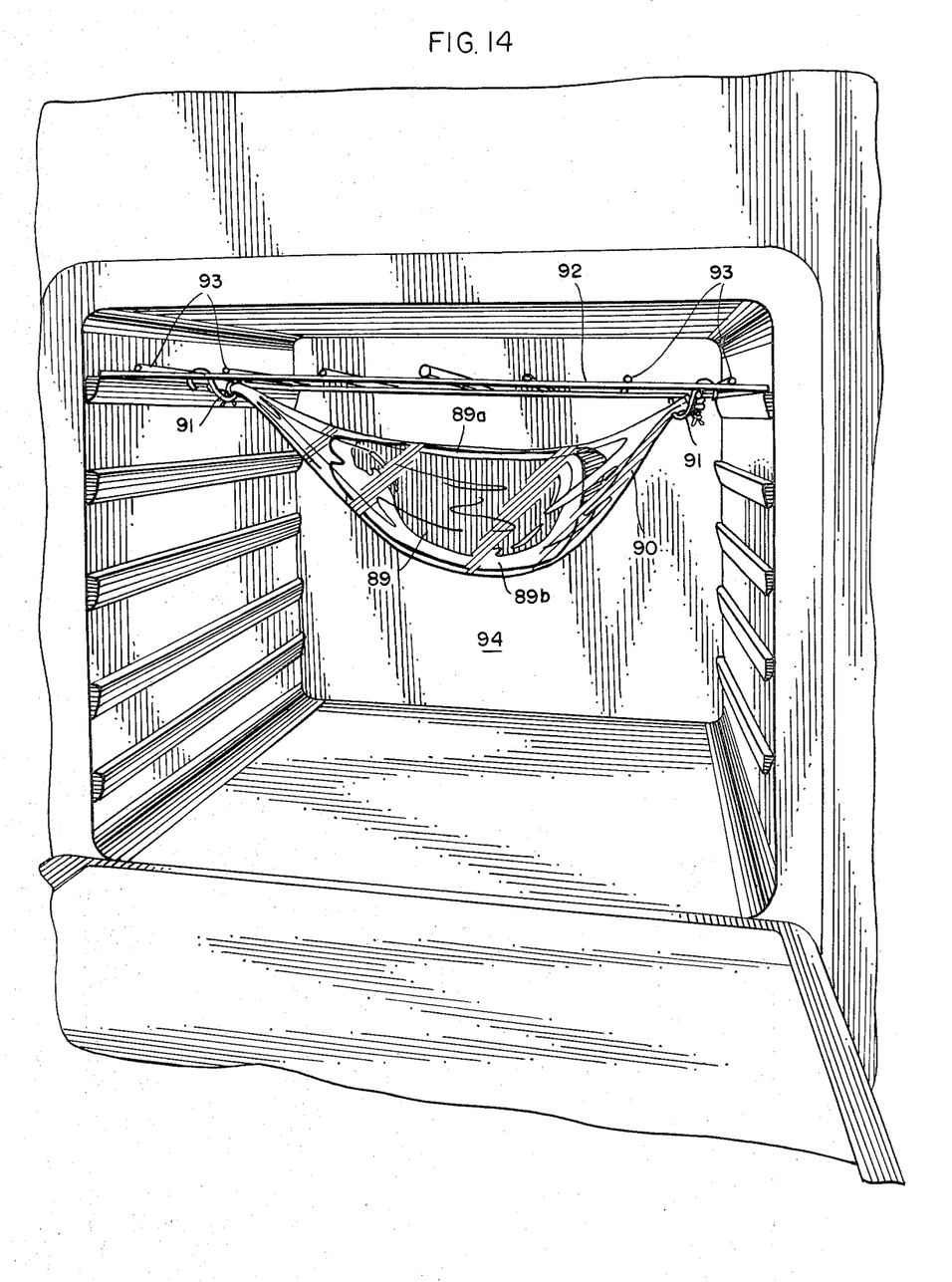
FIG. 14 is a perspective view of a roast packaged within a hammock-like tubular plastic web having hooks that swing the package from an oven's own rack.
Figure 15:
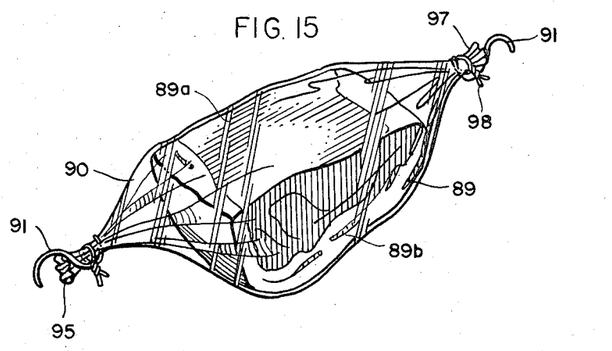
FIG. 15 is a perspective view of the package of FIG. 14.

FIGS. 14 and 15 illustrate an extremely simple and very inexpensive alternative method and means for achieving the major objectives of this invention by utilizing the underside of one of the movable racks (or shelves or hooks) which are standard equipment in all ovens from which to hang my web-enclosed meat roast. This is a surprising and completely novel way of accomplishing the purposes of this invention because heretofore the underside of oven shelves have not per se had any known utility.

In utilizing this preferred method and means, a roast 89 is packaged and cradled within a hammock-like and tubular imperforate plastic roast-holding web 90, with both ends of the web having tied loops, punched holes, folded-over sealed edges, wired closures, or the like, into which metal or plastic hooks 91 have been inserted. These hooks, in turn, are then used to hook both ends of the roast-holding web onto the underside of an oven rack 92 having fore and aft rods 93 so that the roast is held suspended within the oven 94 within the web, all free and clear of contact with any pieces or surfaces of metal within the oven. Since the housewife requires no pans or structures other than those (racks or shelves) already in position in every household oven, she can simply elevate an oven rack to the highest shelf position within her oven, and hook the roast-carrying web, with its attached hooks, to the rods of the rack on the underside of such an elevated rack. Alternatively, she may twist the ends of my hammock-like tubular web; then hook or loop the twisted ends over and under separated wires of an oven rack, and fasten or tie the loops to hold them fast around their respective wires—just as the end ropes of a real-life hammock are tied to separated tree branches. Thus, when purchasing any size or shape of meat in the retail store, she never has to worry about whether or not she has a pan or rack at home that will accommodate it. If the meat fits into her oven, my preferred embodiment will automatically handle it according to the roasting specifications of this invention.

It is another specific objective of this invention, therefore, to provide a package having a meat-carrying web structure and/or adapted to be attached to and slung like a hammock underneath the wires of an oven's rack; thus turning the underside of an oven's rack into a hitherto never-before-used function and utility.

Figure 16:
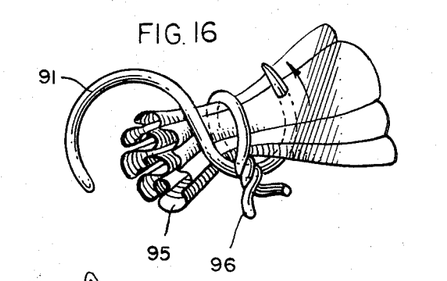
FIG. 16 is an enlarged view of one of the ends of the package of FIG. 15.

This discovery also lead to another discovery, i.e., the roasting of boneless beef ribs with their fat sides down. In FIG. 14 the web-enfolded roast rests with its protein side 89a up and its fat side 89b down. In FIGS. 15 and 16, I show one supporting means for suspending roasts lying fat-side down in my hammock-like web. The end 95 of the tubular web 90 is tightly secured by a twisted wire 96, or a similar closure device, and the S-shaped hook 91 extends below the wire and through the plastic web for engagement with the wire. The other end 97 of the package is closed by a similar wire 98, and, if desired, the ends of the package can be twisted before applying the wires.

Figure 17:
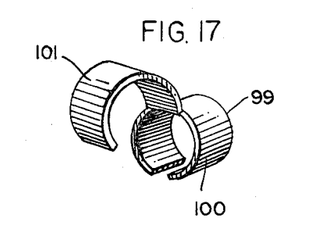
FIG. 17 is a perspective view of a modified hook for supporting the package.

A modified closure and support device 99 is shown in FIG. 17. The device 99 includes an interrupted clamping ring 100 and a hook 101. The ends of the web can be inserted through the ring, and the ring can be clamped with pliers or the like to secure the ring to the web. The hooks 101 may then be used to suspend the package from the rods of the rack.

Figures 18, 19:
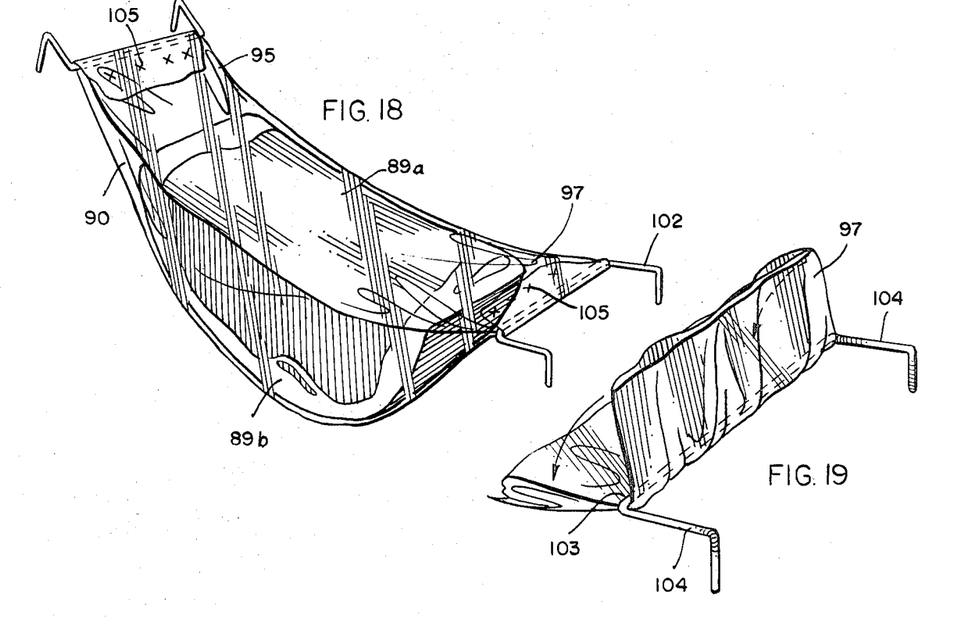
FIG. 18 is a perspective view of a roast packaged within another embodiment of a hammock-like tubular plastic web having a hook structure that provides spreader arms at each end of web.
FIG. 19 is an enlarged view of one of the ends of the package of FIG. 18 showing the method of attaching the hook.

Another supporting means for the web 90 is illustrated in FIGS. 18 and 19. A hook 102 is provided for each of the web ends 95 and 97, and each hook includes an elongated central, hammock-like "spreader-arm" portion 103 and a pair of L-shaped end portions 104. Each end of the web is folded, and thus reinforced, over the central portion of a hook and secured, as by heat sealing 105, so that the L-shaped ends of the hook can hook on to the rods of the rack in only one right side up (i.e., fat side of the roast down) position. Referring to FIG. 18, the hooks will support the package in the position illustrated. However, if the package were inverted so that the fat side 89b were up, the L-shaped ends of the hooks would not hook onto the rods to support the package.

The foregoing hook structures, which limit the functioning of the hooks to only one right way, is important to the preferred (fat side down) method of practicing my invention. Roasting beef with the fat side up is centuries old prior art, in both recipe and practice. To change such a long standing habit is a formidable task. To anyone knowledgeable in the ways of consumers, in the difficulties of changing ingrained mass habits, even such an apparently simple, with easily demonstrated advantages, change as roasting fat side down rather than fat side up is not an easy accomplishment. Thus, since an important part of the commercial success of my preferred roasting package will depend on roasting beef with the fat side down, it is desirable that positive assurance be provided that this will be accomplished. Simple written and/or illustrated instructions to consumers does not necessarily mean that consumers will follow the instructions. It is a well-known fact, and a standing complaint from food manufacturers whose foods must be properly prepared by following recipes printed on packages, that large numbers of consumers fail to follow instructions. This results in unhappy consumers and loss of business to manufacturers.

Since roasting a boneless rib of beef with the fat side down assists in controlling the relative relaxation of the protein fibers during the roasting process which, in turn, more evenly controls and reduces the amount of protein juice loss and therefore, too, improves the relative juiciness and more positively assures perfect rareness of the finished roast, it is an additional and specific objective of this invention to provide a package structure whereby it is practically impossible for a user to roast with the fat side up. The specific objective here is to provide a preferred and foolproof method and means for roasting beef with the fat side down by structuring my web-holding hooks, or any other appropriate web-holding means, in such a manner that they can be attached to the underside of an oven rack in only one way; a way that will guarantee that the fat side of the roast is in the down position.

In addition to roasting with the fat side down, the precise manner in which the roast is resting during roasting is also influential for protein-juice retention. The curvature of the bones of a beef rib roast determines the inside and outside shape of the piece of meat. When the ribs are removed, the surface of the rib side (protein-inside side) loses its definitive surface shape, but the fat-covered outside (and most of the protein inside which is attached to it) will remain substantially intact with its original curvature so long as the meat remains chilled and is not bent or rolled and tied. The connecting tissues between the fat and protein sections will thus remain substantially undisturbed; they have not been stretched or strained to the point of tearing or breaking. When the meat loses its chill and firmness by heating, and its original curvatured shape is not retained, the connective tissues between protein and fat sections are stretched, strained, and may even be torn. At any rate, this condition is not conducive to the best retention of protein juices.

With my preferred tubular, hammock-like package, however, the packaged roasting meat is resting in a fat side down position substantially the same as its natural curvature before boning out the ribs. Even though roasting temperatures renders its body limp, my preferred package cradles, positions, and supports the meat during roasting so that there is no pulling stress or strain on the connective tissues between the fat and protein sections or within the protein section itself. Therefore, all protein cell fibers, though structurally relaxed during roasting, are maintained in substantially their original structural shape by the hammock-like curvature support provided by my package.

Like a real-life hammock which can be tightened or loosened to provide a relatively level or curved angle in which the occupant can lie, my meat-holding tubular hammock package may also be positioned to give the meat whatever supporting angle is most suited to its natural curvature. This is accomplished by simply hooking the hooks closer or wider apart, between the ends of the web, on the wires of the oven rack. By spacing the hooks outward from each other at each end of the web, my hammock package is made taut, and by bringing the hook ends closer together the hammock package will droop to whatever curvature is desired. Additionally, too, like a real-life hammock the elongated hook portion 103 of FIGS. 18 and 19 acts as a "spreader arm" to accommodate any side-to-side flatness and/or thickness that may be desirable for a truly relaxing support for the contour of any particular piece of meat lying on and within web 90. The ends of the web may be folded inwardly before securing to the hooks 102 in order to more fully accomplish this web-to-meat accommodation. Thus the web, its hooks, and even the underside of an oven rack provide adjustable means that can cooperate to accommodate themselves to the natural shape of any cut of meat.

It is therefore an additional specific objective to provide a package structure that roasts a boneless rib of beef within a tubular, suspended, hammock-like package that substantially retains and maintains the original contour of the roast and assures that the meat itself is lying in a fat down, normally contoured, position.

Such cradling, contour accomodating, curvature supporting, of meat like a boneless rib of beef that lacks self support for its shape once its supporting bony structure is removed also has applicability for meat and poultry items in which the bone structure remains intact during roasting, but which is structured in such a way that it does not provide its own needed support. A unique example of such a product is a turkey.

Turkey roast presents so many problems that no single roasting method and means, until my invention, had the versatility and/or adapability required to answer all of them. Some of these problems are the following:

1. Three different kinds of foods are usually involved: white breast meat, dark meat on legs and back (with each of these meats having different fiber, fat, protein, and water compositions), and the inside stuffings (of a bewildering variety; each particular housewife having her own particular recipe).

2. Different emphasis on the cookery of these different foods: Some prefer the white meat roasted soft and juicy at the expense of the dark meat, or vice versa; some prefer to have the stuffing's drippings (it may have such flavor-pleasing contents as apples, sausages, spices, etc.) coat the breast meat, while others wish it to flow around the dark meat.

3. Prior art methods all use metal pans in which to rest turkeys. The housewife must choose which portion of the turkey must bear the weight while roasting. The portion that bears the weight also takes the brunt of the undesirable meat and juice burning that occurs where hot metal is contacted. The result is burned juices and burned portions where the bird rested on the metal pans.

4. If the turkey is positioned back side down, the legs must be trussed to the body, or supported in a manner to keep them from falling away from the body. If the turkey is positioned breast down, the breast bone (or, "keel" bone, as it is called because it protrudes out like the keel of a boat when pressure is put on the breast meat) is too narrow and protruding to support the bird in a firm, non-teetering level position. If form-fitting metal pans or racks are used the narrow wires or perforated plates give only partial support. Being rigid, they can, at best, give only an approximate fit to the shape of a particular turkey breast; and at the openings between the metal portions the weight of the bird usually pushes breast meat through and out of its metal support. This leaves the breast meat with sear marks where it was pressured against the metal, and bumpy portions where it was pressured through the metal openings. Furthermore, such supportive implements permit breast juices to seep out and away from the breast, rather than retain and confine them where they are most desired.

With my tubular, hammock-like package encasing a turkey and suspending it within an oven away from any high heat, meat-burning metal and/or any hard unyielding, non-breast-contour-conforming surface; and being adjustable and flexible to conform to whatever shaped turkey breast that is within the package, the breast and/or legs will be perfectly supported in both proper position and distributed weight, and roasted with the excreted juices collected and/or retained where desired and with heat contact of a uniform non-sear-mark-producing and/or non-meat-burning nature.

Some housewives like to roast turkey with a two-stage method: first with the breast down, and then with the breast up, to achieve special flavoring and browning effects. At best, this is a very difficult procedure because it requires a hot turkey to be turned over. The heat on one's hands, and the partial dismemberment of the turkey are both practically unavoidable accompaniments to this method. But when roasted in my tubular turkey-enclosing hammock, which snugly enfolds and holds the turkey's body intact, the housewife need only handle the ends of my always-cool tubular web and turn it over on its hooks, without hurting her hands or shifting the turkey out of the body support and protection afforded by confinement in my hammock. And since the hammock web does not lie against any hot metal surfaces, the turkey's meat and juices are not burned.

Thus my tubular, flexible, hammock-suspension method and means for roasting turkeys provides a universally adaptable, singular, solution to the large variety of problems and conditions encountered in the roasting of turkeys.

FIGS. 14–19 show my most commercially preferable method and means for practicing this invention. It embodies the lowest package cost; the maximum convenience for housewife or restaurateur; the most positive control of the important factors of fat down positioning and weight distribution during roasting; the easiest to handle, simplest to maneuver, arrange, and adjust within an oven to conform to the natural contour of whatever piece of meat or poultry that is within my package; the most beneficial manner for collecting and preserving excreting juices in a location where they will do the most good and/or the least harm to the roasting meat; the softest possible (fat) surface on which the protein-fiber areas of beef can rest; the cleanest and laziest way to roast meat because it eliminates both spatter of juices outside the package and the use of any pots or pans.

Figure 20:
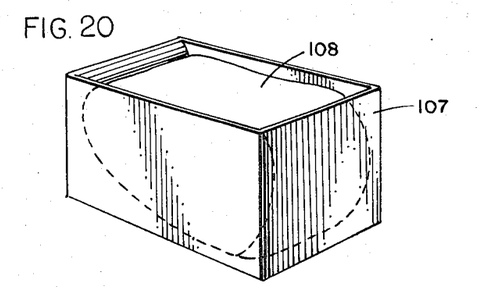
FIG. 20 is a perspective view of a roast packaged within a plastic sheet which is form-molded to serve as a perfect fitting cradle package for transporting and roasting the meat.
Figure 21:
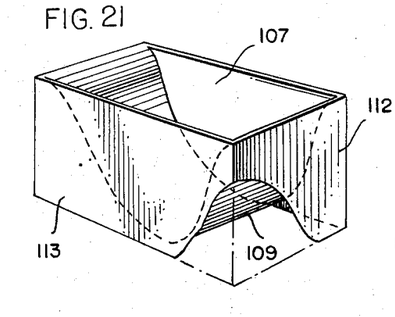
FIG. 21 is a perspective view of the package of FIG. 20 without the meat.
Figure 22:
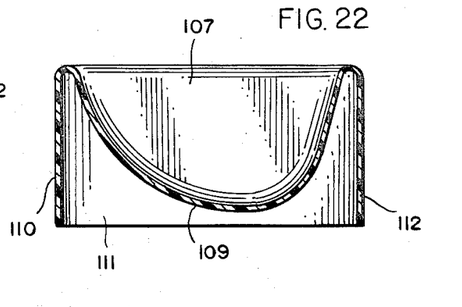
FIG. 22 is a longitudinal sectional view of the cradle of FIGS. 20 and 21.

FIG. 20 illustrates a single plastic sheet 107 molded over a boneless beef rib 108 and serving together to comprise my package. This embodiment of my invention serves the double function of (1) a perfect individually-fitted, form-fitting cradle 109 (for maximum weight distribution in which the roast is nested, and (2) a structure with extensions forming flat sides 110, 111, 112 and 113 which serve as peripheral legs on which the cradle with its nesting roast can rest while enroute through channels of distribution and in the oven while roasting. These sides extend downwardly about 1 inch beyond the lowest point of the cradle section of the package so that the cradle section is well elevated out of contact with any metal surface in the oven on which it may be standing.

Figure 23:
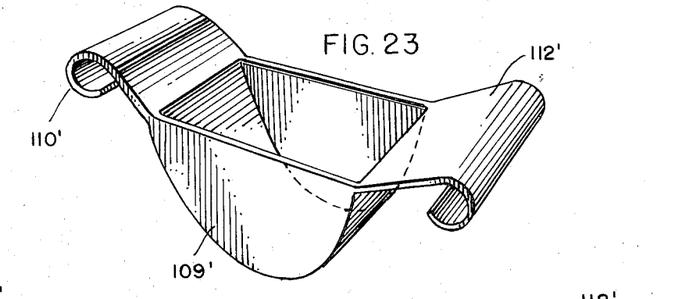
FIG. 23 is still another embodiment of a form-molded package for transporting and roasting meat.
Figure 24:
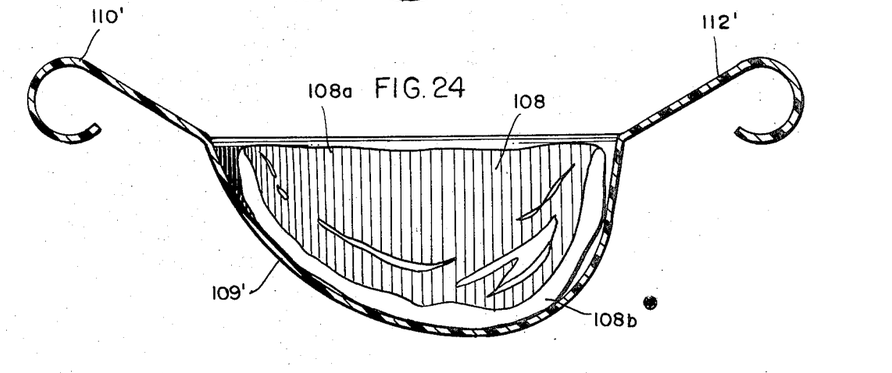
FIG. 24 is an enlarged longitudinal sectional view of the package of FIG. 23 supporting a roast.

FIGS. 23 and 24 show an adaption of the package of FIG. 20 with two of the side legs 111 and 113 removed and the end legs 110' and 112' modified to serve as hooks for hanging the meat-containing cradle 109' from the for hanging the meat-containing cradle 110' and 112' are molded into the hooked shape illustrated so that the hooked ends will not straighten out under the weight of the package, and the roast 108 is supported with its fat side 108b down and its protein side 108a up.

From the foregoing, it would seem that my invention has several surprising aspects:

1. Its utter simplicity in performing several diverse and heretofore complicated functions, while remaining extremely low in cost.

2. Its ability to perform these functions, and thus produce the long-sought-for beneficial result of a perfectly rare beef rib roast, in a manner that is uniquely new and different within a field of patented art that is voluminous.

3. A dual purpose package structure that during the marketing phase of its functional life serves as a passive, stationary, protective enclosure for a piece of meat, and then during its roasting use phase, its preferred embodiment changes function to become an active, swinging, hammock or sling supporting and suspending the meat in a maximum weight-distributing manner, and free from any contact with surfaces too hot for the human hand to touch. Thus, a package structure for achieving the sought for advantages during the marketing phase is also the same structure, but in a reverse functional relationship to the meat, that achieves the sought-for advantages during the roasting phase.

4. In its preferred embodiment, one package structure that fulfills numerous functional objectives for all sizes, shapes and weights of meat cuts.

5. The paradoxical ability to reduce in roasting meat the scientifically known biological and physiological internal causes of juice loss and fiber toughness by use of an external nonbiological, nonphysiological, method and means.

6. The contradictory function of roasting meat at temperatures too hot for sustained human body contact, while resting the meat on a webbing that is always comfortable for such contact.

7. Changing a liability into an asset by using the meat's own fat coating (an economic and nutritional liability in today's dietary) as a soft pillow-like cushioning base (an economic and nutritional asset with my invention) on which to rest the attached economically valuable, desirable eating protein portion of the meat; thus changing the undesirable eating fat portion liability of a beef roast into a valuable and ideal asset in reducing (and practically eliminating) weight pressures and juice losses in the desirable protein portions.

8. Turning the heretofore non-useful (per se) bottom side (underside) of a metal oven rack (or shelf) into a highly useful, superbly functional, and utilitarian means for supporting and slinging a hammock-like package of meat free from all contact with any and all metal surfaces and/or objects within a roasting oven.

It is these several foregoing surprising, paradoxical, and/or contradictory aspects that apparently have rendered the present discovery nonobvious to prior practitioners in this field of art.

While in the foregoing specification, a detailed description of specific embodiments of my invention were set forth for the purpose of illustration, it is to be understood that many of the details herein given may be varied considerably by those skilled in the art without departing from the spirit and scope of my invention.

I claim:

1. A method for roasting a meat roast within an oven comprising the steps of:
  (a) supporting the meat roast on a flexible web having a thickness within the range of about 0.001 to about 0.01 inch, the web being formed of material which is sufficiently flexible to permit the web to conform to the natural contour of the meat, which is heat-resistant at the temperature at which the meat will be roasted, which is strong enough to support the meat, and which is comfortable to the human hand at the temperature at which the meat will be roasted;
  (b) suspending the meat-holding web from support means within the oven so that the meat is maintained out of contact with surfaces of the oven, the flexible web substantially conforming to the contour of the meat surface contacting the web so that the pressure exerted on the meat by the web is less than ¼ p.s.i. whereby the juice loss due to pressures exerted on the meat is substantially reduced during subsequent cooking;
  (c) roasting the meat by radiant dry heat while,
  (d) maintaining the meat out of contact with any surfaces of the oven, and
  (e) maintaining said meat out of contact with any surface that will not conform to the contour of the meat whereby said meat is roasted completely and uniformly throughout the entire inside from the center to the very edges of the roast's protein section.

2. The method of claim 1 in which the meat has a fat side, the meat being supported by the web in a fat-side-down position in which the fat side of the meat is supported by the web.

3. A method for roasting a turkey within an oven comprising the steps of:
  (a) supporting the turkey on a flexible web having a thickness within the range of about 0.001 to about 0.01 inch, the web being formed of material which is sufficiently flexible to permit the web to conform to the natural contour of the turkey, which is heat-resistant at the temperature at which the turkey will be roasted, which is strong enough to support the turkey, and which is comfortable to the human hand at the temperature at which the turkey will be roasted;
  (b) suspending the turkey-holding web from support means within the oven so that the turkey is maintained out of contact with surfaces of the oven, the flexible web substantially conforming to the contour of the turkey surface contacting the web so that the the pressure exerted on the turkey by the web is less than ¼ p.s.i. whereby the juice loss due to pressures exerted on the turkey is substantially reduced during subsequent cooking;
  (c) roasting the turkey by radiant dry heat while,
  (d) maintaining the turkey out of contact with any surfaces of the oven, and
  (e) maintaining said turkey out of contact with any surface that will not conform to the contour of the turkey whereby said turkey is roasted completely and uniformly throughout the entire inside from the center to the very edges of the turkey's protein section.

4. The method of claim 3 in which the turkey has a breast, the turkey being supported by the web in a breast side down position.

References Cited
UNITED STATES PATENTS

| | | | |
|---|---|---|---|
| 2,199,584 | 5/1940 | Bemis | 99—107 |
| 2,297,332 | 9/1942 | Stewart | 294—1 |
| 3,359,889 | 12/1967 | Young et al. | 99—426 |

HYMAN LORD, Primary Examiner